(12) United States Patent
Boutte

(10) Patent No.: US 9,603,403 B2
(45) Date of Patent: Mar. 28, 2017

(54) HELMET-MOUNTED MOTORCYCLE RIDER VISUALIZATION DEVICE

(71) Applicant: Angela Boutte, Youngsville, LA (US)

(72) Inventor: Angela Boutte, Youngsville, LA (US)

( * ) Notice: Subject to any disclaimer, the term of this patent is extended or adjusted under 35 U.S.C. 154(b) by 0 days.

(21) Appl. No.: 14/048,499

(22) Filed: Oct. 8, 2013

(65) Prior Publication Data
US 2014/0104055 A1    Apr. 17, 2014

Related U.S. Application Data

(60) Provisional application No. 61/713,936, filed on Oct. 15, 2012.

(51) Int. Cl.
*B60Q 1/26*  (2006.01)
*A42B 3/04*  (2006.01)

(52) U.S. Cl.
CPC .............. *A42B 3/0453* (2013.01); *B60Q 1/26* (2013.01); *B60Q 1/2676* (2013.01)

(58) Field of Classification Search
CPC ...... A41D 13/01; A42B 3/044; A42B 3/0453; B60Q 1/2673; B60Q 1/2676; B60Q 1/26
USPC .......................... 340/468, 479, 475, 432, 427
See application file for complete search history.

(56) References Cited

U.S. PATENT DOCUMENTS

| | | | |
|---|---|---|---|
| 4,956,752 A | 9/1990 | Foglietti | |
| 5,704,707 A | 1/1998 | Gebelein et al. | |
| 5,910,764 A | 6/1999 | Hayden | |
| 6,406,168 B1 | 6/2002 | Whiting | |
| 6,982,633 B2 * | 1/2006 | Burdick | 340/432 |
| 7,932,820 B2 * | 4/2011 | Hurwitz | 340/479 |
| 7,948,367 B1 * | 5/2011 | Arauza | A42B 3/0453 340/332 |
| 8,009,031 B2 * | 8/2011 | Pacheco et al. | 340/479 |
| 8,245,326 B1 * | 8/2012 | Tolve | A42B 3/306 2/209.13 |
| 2007/0285221 A1 | 12/2007 | Howe et al. | |
| 2009/0140847 A1 * | 6/2009 | Yen et al. | 340/432 |

FOREIGN PATENT DOCUMENTS

BR            200901767 A2 *   2/2011

* cited by examiner

*Primary Examiner* — Toan N Pham
(74) *Attorney, Agent, or Firm* — Global Intellectual Property Agency, LLC; Daniel Boudwin

(57) ABSTRACT

A motorcycle helmet indicator assembly is provided that includes a passive and active illumination means. The assembly is either built-into or is an attachable assembly for a motorcycle helmet, wherein a short range wireless protocol is utilized to synchronize the motorcycle brake lights and turn signals with two indicators along secured along the rear of the motorcycle helmet. Each of the indicator bezels is surrounded by a passive reflector surface, wherein the helmet is visible in low light whether the motorcycle indicators are energized or not. This promotes visualizing motorcyclist in traffic and in low light conditions, improving awareness of the motorcyclist's position in traffic and improving his or her safety.

12 Claims, 2 Drawing Sheets

HELMET-MOUNTED MOTORCYCLE RIDER VISUALIZATION DEVICE

CROSS REFERENCE TO RELATED APPLICATION

This application claims the benefit of U.S. Provisional Application No. 61/713,936 filed on Oct. 15, 2012, entitled "Helmet BrakeLight." The above identified patent application is herein incorporated by reference in its entirety to provide continuity of disclosure.

BACKGROUND OF THE INVENTION

Field of the Invention

The present invention relates to vehicle indicators that alert nearby motorists of the vehicle's condition and intent while in traffic. More specifically, the present invention pertains to a motorcycle helmet indicator assembly that is built into the helmet or attachable thereto, whereby the indicator provides brake lights, turn signals, and hazard indicators from the motorcycle, along with a bezel that is surrounded by a reflective surface for improved visualization of the rider within traffic.

Riding a motorcycle in traffic is inherently dangerous and requires experience on the part of the rider to avoid dangerous situations with other motorists and with oncoming road hazards. The most common example of motorcycle and vehicle accidents involves a motorist who does not even see the motorcyclist in traffic and turns into the rider. The rider is forced to take evasive maneuver and cannot always avoid the collision. Because of this, riders are taught to avoid blind spots of vehicles, to ride along the driver's side of the lane, and to avoid being stuck in heavy traffic.

To improve visibility, many riders employ reflective vests, bright colored jackets, or other visual markers on their person to announce their presence in traffic and do as much as possible to ensure other motorists are aware of their location. The ability to locate a rider in traffic is imperative to prevent collisions between riders and motorists when the motorist is affecting a lane change maneuver or when braking behind a rider. Since the rider is taller than most of the traffic, providing reflective apparel and indicator means on the rider's person improves visibility and reduces the likelihood the rider will go unnoticed between cars.

The present invention provides a new and improved motorcycle helmet that includes a passive and active indication means thereon. The present invention serves as an improvement to existing turn signal and brake signal indicating motorcycle helmets in the art by providing a light bezel that is supplemented by a passive reflector surface therearound. The present invention is built into a helmet and incorporated into its design, or alternative is attachable to an existing helmet design. A module is attached to the motorcycle to interpret indicator operation and to transmit a signal to the helmet assembly to energize the active illumination sources thereon in the appropriate manner (i.e. brake light activation, turn signal activation, hazard light activation, etc.).

Description of the Prior Art

Devices have been disclosed in the prior art that relate to motorcycle helmets having indicators thereon. These include devices that have been patented and published in patent application publications, and generally relate to indicator assemblies that wirelessly or physically connect to a module secured to the motorcycle for transmitting a motorcycle signal to a signal light on the motorcycle helmet. These devices serve a similar purpose and disclose similar elements, but fail to contemplate both a passive and active illumination means from the rear of the helmet. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 5,704,707 to Gebelein, which discloses a helmet mounted brake light system that utilizes an infrared beam transmission between the motorcycle and the helmet to coordinate brake and turn signal indications. The helmet comprises an infrared transmitter on the motorcycle and an infrared receiver along the front of the motorcyclist's helmet, where the motorcycle communicates indications to the helmet via an infrared transmission. The transmission activates brake and turn indicators along the rear of the rider's helmet for those in traffic to visualize. The Gebelein device, while providing a means of indicating a motorcycle's brake and turn signals using a wireless transmission, uses infrared technology that relies on line of sight between the transmitter and receiver. The present invention utilizes a wireless radio signal that does not rely on line of sight, but rather proximity to the transmitter.

Another such device is U.S. Pat. No. 4,956,752 to Foglietti, which discloses a motorcycle helmet with a rear signal that provides motorists to the rear of the rider to understand the state of the motorcycle and the state of the motorcycle's brakes. The system signals red when the brakes are applied and illuminates in green when the motorcycle is in forward motion and not under braking. The light turns amber when the brakes are lightly applied. In this way, the Foglietti device provides a status indication for nearby motorist of the state of the motorcycle in front of them. The Foglietti device, however, fails to anticipate the turn signal application of the present invention or the reflective light bezels herein disclosed.

U.S. Pat. No. 5,910,764 to Hayden discloses a helmet brake light system that is coupled in proximity to the motorcycle's rear brake light and is electrically connected to the motorcycle's battery power source. The helmet brake light is energized when the rear brake light of the motorcycle is energized, and only when the two are electrically coupled. The Hayden device, while providing a helmet with a rear brake light, requires a physical connection and a helmet that is positioned in close proximity to the existing brake light. This requires the rider to remove his or her helmet for functionality of the device, which eliminates the helmet's ability to protect the rider in the event of a crash.

U.S. Patent Publication No. 2007/0285221 to Howe discloses a motorcycle helmet or motorcycle helmet accessory that utilizes short range wireless transmission to communication signals from the motorcycle to the helmet for indicating turn signals or brake lights. A radio frequency transmitter is utilized that is coupled to the motorcycle's turn and brake signals, whereby the transmitter connection wirelessly or through a pigtail connection to the helmet for energizes the light sources thereon. Similar to the Howe disclosure is U.S. Pat. No. 6,406,168 to Whiting and U.S. Pat. No. 7,948,367 to Arauza, which both contemplate wireless communication with a display means mounted on the rear of the helmet.

The How, Whiting, and Arauza devices are exemplary examples in the art of helmet supported light signals that wireless communicate to the motorcycle and synchronize signals therefrom. The present invention discloses a similar assembly, however with the addition of a passive reflector assembly around each of the light source bezels for improved illumination of the rider even when a turn signal, running light, or brake light is not energized. This improves rider visualization both in traffic and in low light areas (e.g. back roads, in wooded areas, etc.) to reduce collisions between motorists and riders on public roads.

The present invention is submitted as being substantially divergent in design elements from the prior art, and consequently fulfilling a need in the art for an improved visualization of motorcycle riders on public roads. In this regard the instant invention substantially fulfills these needs.

SUMMARY OF THE INVENTION

In view of the foregoing disadvantages inherent in the known types of motorcycle helmets now present in the prior art, the present invention provides a new indicating and reflecting motorcycle helmet or helmet accessory that can be utilized for improving visualization of the rider in low light conditions and while in traffic with other motorists.

It is therefore an object of the present invention to provide a new and improved motorcycle rider visualization device that has all of the advantages of the prior art and none of the disadvantages.

It is another object of the present invention to provide a motorcycle rider visualization device that coordinates turn signals, braking signals, hazard signals, and general operation with that of the motorcycle signals, and energizes accordingly therewith.

Another object of the present invention is to provide motorcycle rider visualization device that includes both passive and active illumination means, wherein the device includes an active light source that energizes based on inputs from the motorcycle, and a passive reflector surface around the light source bezels.

Yet another object of the present invention is to provide motorcycle rider visualization device that comprises a motorcycle helmet accessory or a specifically designed motorcycle helmet incorporating the elements of the present invention.

Another object of the present invention is to provide motorcycle rider visualization device that operates wirelessly, wherein a short range wireless signal coordinates the lights between the motorcycle and the helmet active illumination means.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
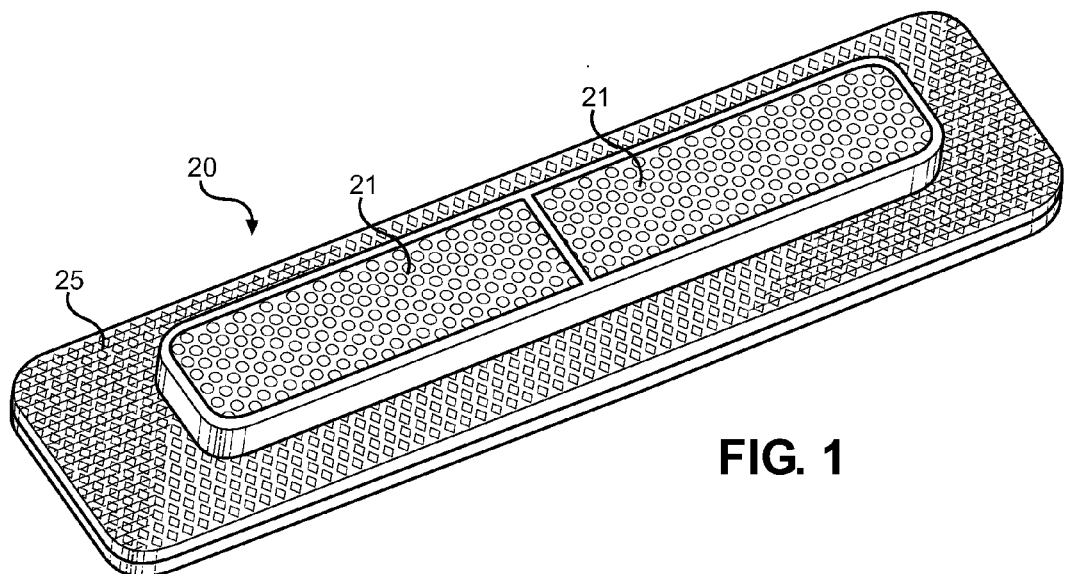
FIG. 1 shows a view of an exemplary embodiment of the motorcycle rider visualization device of the present invention.

Reference is made herein to the attached drawings. Like reference numerals are used throughout the drawings to depict like or similar elements of the motorcycle rider visualization device. For the purposes of presenting a brief and clear description of the present invention, the preferred embodiment will be discussed as used for providing a passive and an active illumination means for motorists to recognize the position of a rider in traffic and in low light. The figures are intended for representative purposes only and should not be considered to be limiting in any respect.

Referring now to FIG. 1, there is shown a perspective view of an exemplary embodiment of the motorcycle rider visualization device of the present invention. The present invention comprises an illuminated and reflective assembly 20 that is attachable to the rear of a motorcycle helmet or is designed into the rear portion of a motorcycle helmet by a helmet manufacturer. The assembly 20 functions in two primary ways: the assembly provides an active illumination means in the form of energizeable light signals 21, and the assembly provides a passive illumination means in the form of a reflective surface around the light source bezels.

The goal of the assembly is to increase the visibility of the rider, and notably the rider's head in traffic and in low light. By providing an indicator assembly and reflective surface along the helmet, the rider's highest point is illuminated, which is much easier for other motorists to see in traffic. By positioning the assembly on the helmet, motorists can visualize the state of the motorcycle and the position of the rider across and through other vehicles (e.g. through other vehicle windows or over the hoods thereof). This increases overall awareness of the rider's presence and increases everyone's safety, which is paramount for a rider given the rider is without the protective shell offered by a typical automobile in the event of a collision or accident.

The assembly 20 comprises an elongated surface 25 that supports an upstanding housing thereon. The housing supports the bezels of the first and second light signals 21 and encloses the electrical elements thereof. The electrical features include at least one circuit for energizing the light signals 21, battery power, a wireless signal receiver for communicating with a transmitter mounted on the motorcycle, as well as the light sources themselves (preferably Light Emitting Diodes (LEDs)). The housing extends away from the elongated surface and directs the light signals away from the surface 25, which is supported along the exterior surface of the helmet along its rear portion. In this way, the light signals project away from the rider's helmet and are directed rearward to supplement the brake lights and turn signal attached to the motorcycle.

The elongated surface supporting the housing comprises a first side and a second side. The first side supports the housing and faces outward from the attached motorcycle helmet, while the second side is attached thereto. If the assembly is to be an accessory for an existing helmet, the second side includes a peel away layer 26 to reveal a tacky adhesive second side, which is utilized to secure the assembly 20 to the rear surface of the motorcycle helmet. The first side of the surface 25 comprises a reflector material thereon, which reflects incoming light for increased illumination of the rider in low light and in traffic. The incoming light from the vehicle headlights reflects from this surface so the motorists can easily recognize the rider, even when the active signals 21 are not in operation. In this way, the reflective surface 25 acts as a passive illumination means when the active signals 21 are not operational or when their battery has been depleted and not recharged.

Figure 2:
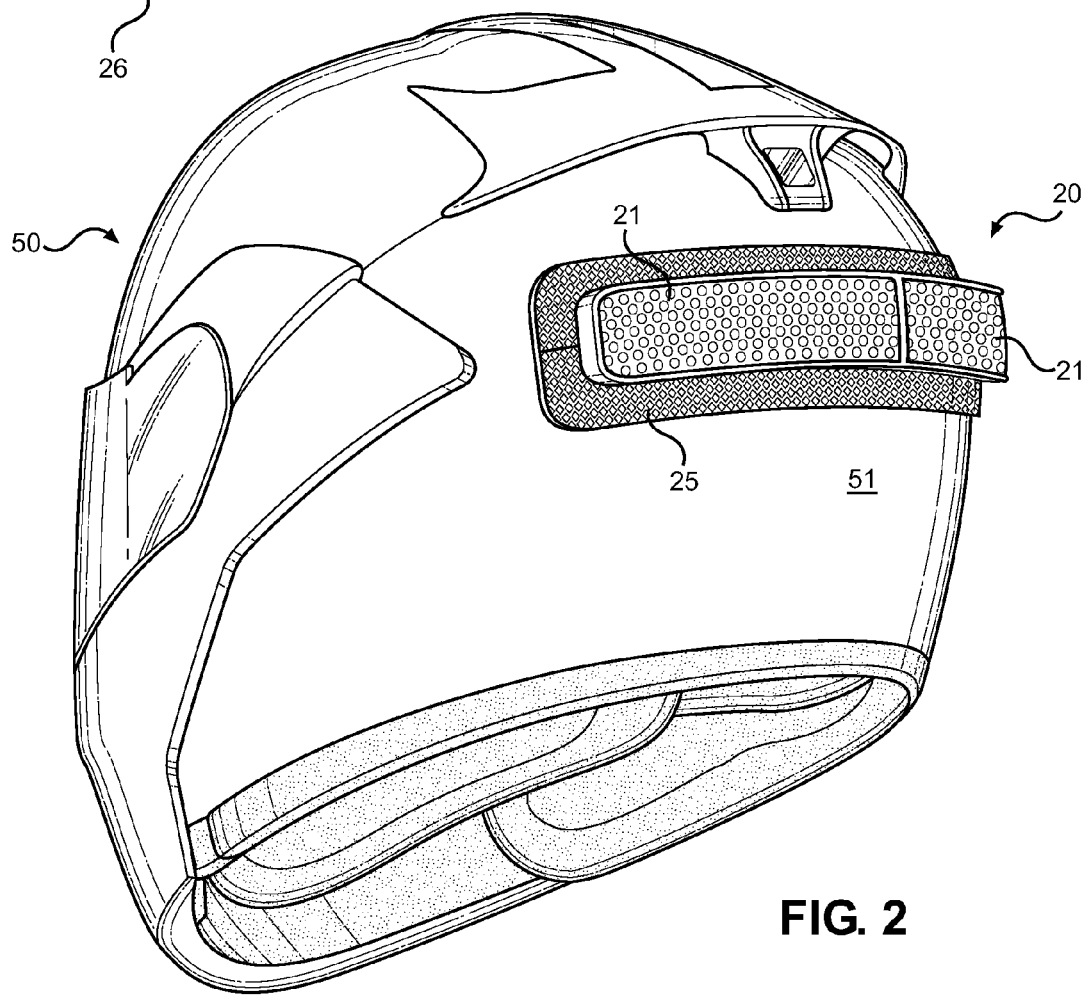
FIG. 2 shows a view of the motorcycle rider visualization device secured to the rear of a motorcycle helmet.

Referring now to FIG. 2, there is shown a view of the motorcycle rider visualization device affixed to the rear surface 51 of a typical full-face motorcycle helmet 50. The assembly 20 is adhered to the rear of a motorcycle helmet 50 or is integrally designed into the rear surface 51 thereof by a helmet manufacturer. When deployed, the reflective surface 25 provides a passive illumination means and the energizeable light signals 21 provide an active illumination means for motorists behind the rider to first visualize the rider in traffic, and further to recognize when the motorcycle is braking, turning or idling.

Figure 3:
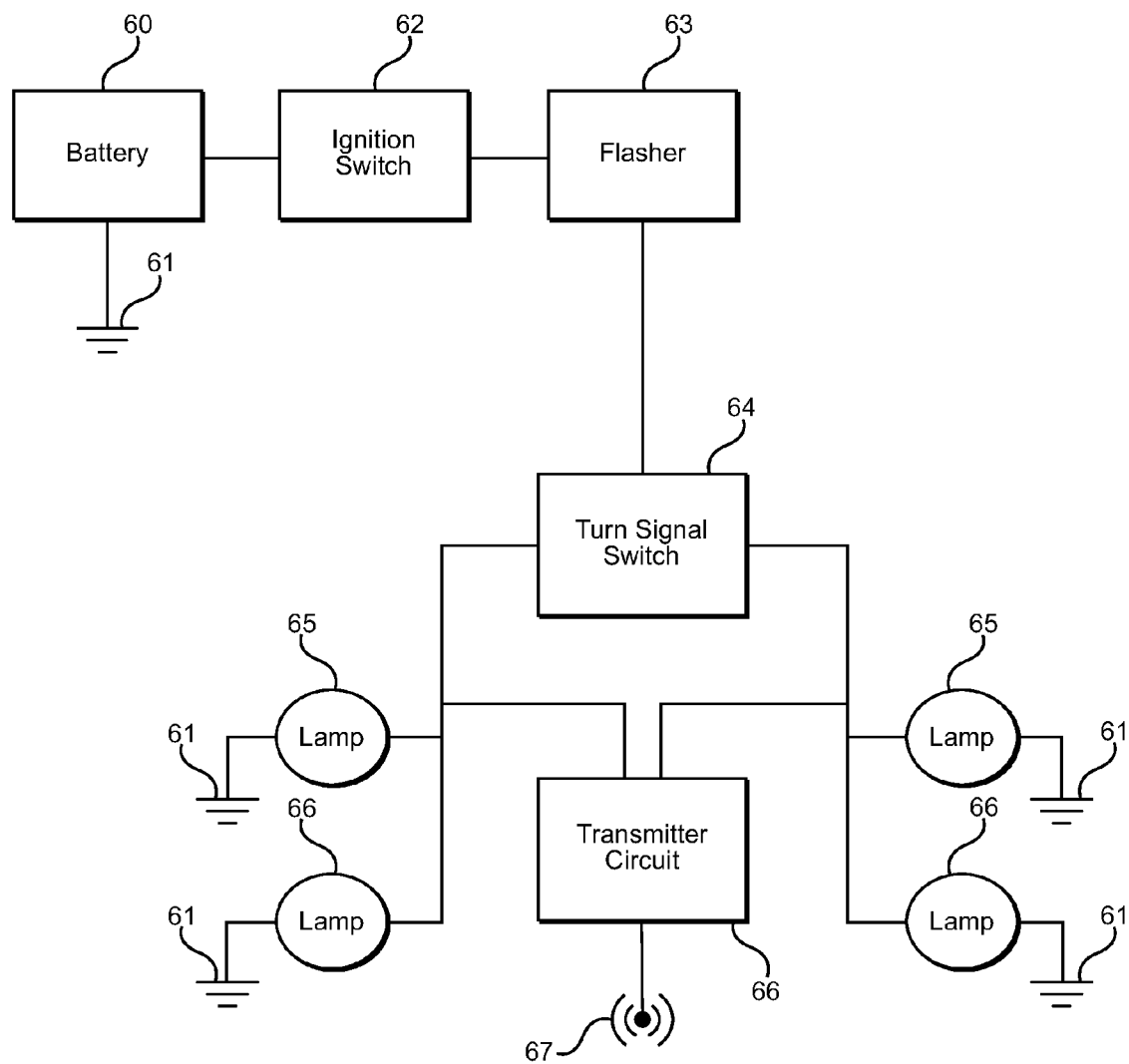
FIG. 3 shows a schematic of the motorcycle signal wiring and the transmitter utilized to communicate with the receiver within the motorcycle rider visualization device on the rear of the rider's helmet.

Referring finally to FIG. 3, there is shown contemplated electrical schematic of the transmitter circuit 66 attached to the motorcycle and electrically connected to the turn signal circuit. The transmitter circuit 66 takes inputs going to the turn signal lamps 65 and utilizes them to transmit a signal to the receiver attached to the rider's helmet, wherein the turn signals can be coordinated between the motorcycle and the light signals on the rider's helmet. The transmitter circuit includes a short range wireless antenna 67 that can pair with the receiver in the assembly on the rider helmet.

The transmitter circuit 66 is a module that is spliced into the electrical wiring of the motorcycle, which then can determine how and when the lamps 65 on the motorcycle are being utilized (in this case, for turn signals). The transmitter then wireless communicates the interpreted signal to the helmet assembly to replicate the motorcycle's signals. The transmitter circuit 66 is spliced between the turn signal switch 64 and the lamps 65 on the motorcycle, while power is drawn directly from the vehicle battery 60 driving the lamps and the electrical features of the motorcycle while in operation. The typical wiring of the motorcycle includes an ignition switch 62 to control overall operation of the circuit, a flasher to pulse the lamps when necessary, a turn signal switch 64 to activate the turn signal lamps 65. The schematic of FIG. 3 is but one configuration and an example of the wiring used to coordinate turn signals. The transmitter circuit 66 is designed to be spliced before the rear lamps and turn signals of the motorcycle to replicate running lights, braking lights, turn signals, and hazard warning lights.

Overall, the present invention is designed to provide both a passive and an active illumination means along the rear of the motorcycle helmet, first to increase awareness of the rider in traffic, and also to coordinate the signaling of the motorcycle to a position higher on the rider's person. When a motorcycle is in front of multiple vehicles, it is difficult for the other vehicles to see the motorcyclist. This can be problematic at any time of day, but especially at night when accidents are prone to happen.

The present invention describes a motorcycle helmet assembly that is wirelessly paired to the motorcycle electrical system to coordinate signals being generated therefrom. The system may further include an ambient light sensor for adjusting the brightness of the lights depending on surrounding conditions. The light sensor can be supported within the housing and directed upward or outward to adjust the light brightness as necessary based on ambient lighting conditions. This allows the light intensity from the light signals to be adjusted based on the outside conditions such that they do not overpower the motorcycle lights.

The light signals themselves are preferably an array of LED light sources that are energized by an appropriate LED circuit. The array may include LEDs of a singular color, or alternatively the array may include one color for braking lights and another color within the array for signifying a turn signal. Finally, the assembly on the motorcycle helmet is powered by an internal battery, which is preferably removable or adapted or receive a charging cord for recharging the batter after extended use.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle rider visualization device, comprising:
   a housing supporting a first light signal and a second light signal;
   an elongated surface having a first side and a second side;
   said first side comprising a reflector surface adapted to reflect light therefrom;
   said first side connecting to said housing;
   said second side comprising an adhesive adapted to connect said second side to the rear of a motorcycle helmet;
   said second side of said elongated surface further comprising a peelable film disposed over said adhesive;
   a light signal electric circuit, a power source, and a receiver circuit supported within said housing;
   a transmitter circuit adapted to be connected to a motorcycle, said transmitter circuit having a wireless transmitter adapted to pair within said receiver and communicate motorcycle signals of said motorcycle to said light signal electrical circuit;
   wherein said motorcycle signals comprise brake lights and turn signals, such that said first light signal and said second light signal are adapted to mimic operation of said motorcycle signals.

2. The motorcycle rider visualization device of claim 1, wherein said power source is a removable battery.

3. The motorcycle rider visualization device of claim 1, wherein said power source is a rechargeable battery.

4. The motorcycle rider visualization device of claim 1, wherein said first light signal and second light signal comprise an array of light emitting diodes.

5. The motorcycle rider visualization device of claim 1, wherein said transmitter circuit comprises a short range wireless protocol that pairs with said receiver circuit.

6. The motorcycle rider visualization device of claim 1, wherein said light signal electric circuit comprises a flasher adapted to cause said first signal light and said second signal light to flash in conjunction with a turn signal of said motorcycle.

7. The motorcycle rider visualization device of claim 1, wherein said reflector surface is positioned around said first signal light and said second signal light.

8. A motorcycle helmet having a rear-mounted visualization device, comprising:
   a motorcycle helmet having a rear surface;
   a housing supporting a first light signal and a second light signal;
   an elongated surface having a first side and a second side;
   said first side comprising a reflector surface adapted to reflect light therefrom;
   said first side connecting to said housing;
   said second side being secured to said rear surface of said motorcycle helmet;
   a light signal electric circuit, a power source, and a receiver circuit supported within said housing;
   a transmitter circuit adapted to be connected to a motorcycle, said transmitter circuit having a wireless transmitter adapted to pair within said receiver and communicate motorcycle signals of said motorcycle to said light signal electrical circuit;
   wherein said motorcycle signals comprise brake lights and turn signals, such that said first light signal and said second light signal are adapted to mimic operation of said motorcycle signals.

9. The motorcycle rider visualization device of claim 8, wherein said power source is a removable battery.

10. The motorcycle rider visualization device of claim 8, wherein said power source is a rechargeable battery.

11. The motorcycle rider visualization device of claim 8, wherein said transmitter circuit comprises a short range wireless protocol that pairs with said receiver circuit.

12. The motorcycle rider visualization device of claim 1, wherein said transmitter circuit comprises a short range wireless protocol that pairs with said receiver circuit.

* * * * *